United States Patent
Stellwagen

(10) Patent No.: US 10,041,438 B2
(45) Date of Patent: Aug. 7, 2018

(54) UNBURNED FUEL VENTING IN INTERNAL COMBUSTION ENGINES

(71) Applicant: Caterpillar Energy Solutions GmbH, Mannheim (DE)

(72) Inventor: Karl Stellwagen, Frankenthal (DE)

(73) Assignee: Caterpillar Energy Solutions GmbH, Mannheim (DE)

(*) Notice: Subject to any disclaimer, the term of this patent is extended or adjusted under 35 U.S.C. 154(b) by 341 days.

(21) Appl. No.: 14/652,761

(22) PCT Filed: Dec. 20, 2013

(86) PCT No.: PCT/EP2013/003924
§ 371 (c)(1),
(2) Date: Jun. 16, 2015

(87) PCT Pub. No.: WO2014/095086
PCT Pub. Date: Jun. 26, 2014

(65) Prior Publication Data
US 2015/0330333 A1    Nov. 19, 2015

(30) Foreign Application Priority Data
Dec. 21, 2012    (EP) .................................... 12198856

(51) Int. Cl.
*F02F 1/18* (2006.01)
*F02F 1/00* (2006.01)
(Continued)

(52) U.S. Cl.
CPC ................ *F02F 1/18* (2013.01); *F02B 77/04* (2013.01); *F02D 13/0276* (2013.01);
(Continued)

(58) Field of Classification Search
CPC .... F02F 1/18; F02F 5/00; F02F 1/004; F02M 26/41; F02M 26/37; F02M 25/06;
(Continued)

(56) References Cited

U.S. PATENT DOCUMENTS 2,758,576 A * 8/1956 Schlamann ......... F02B 19/1014
123/257
3,583,375 A * 6/1971 Pischinger .............. F02B 47/08
123/568.11
(Continued)

FOREIGN PATENT DOCUMENTS

| JP | 53-065510 A | 6/1978 |
|---|---|---|
| JP | S62-26346 A | 2/1987 |

(Continued)

OTHER PUBLICATIONS

International Search Report dated Dec. 5, 2014, in Patent Application No. PCT/EP2013/003924 by the European Patent Office (2 pages).
(Continued)

*Primary Examiner* — Jason Newton

(57) ABSTRACT

An internal combustion engine is disclosed. The engine may have a cylinder that defines a combustion chamber for combusting an air/fuel mixture. The engine may also have a piston reciprocally movable within the cylinder between a top dead center (TDC) and a bottom dead center (BDC). The piston may have an uppermost piston ring configured to sealingly contact the cylinder. The engine may have an annular crevice facing the combustion chamber. The crevice may be defined by the cylinder, the piston, and the uppermost piston ring. The engine may also have a flow channel fluidly connected to the combustion chamber. The flow channel may direct unburned air/fuel-mixture out of the combustion chamber. The at least one flow channel may be
(Continued)

fluidly connected to the annular crevice for a crank angle range of about 85° to 95° and about 265° to 275° after the top dead center (TDC).

19 Claims, 2 Drawing Sheets

(51) Int. Cl.
    *F02B 77/04* (2006.01)
    *F02M 25/06* (2016.01)
    *F02D 13/02* (2006.01)
    *F02F 5/00* (2006.01)
    *F02M 26/37* (2016.01)
    *F02M 26/41* (2016.01)

(52) U.S. Cl.
    CPC ............... *F02F 1/004* (2013.01); *F02F 5/00* (2013.01); *F02M 25/06* (2013.01); *F02M 26/37* (2016.02); *F02M 26/41* (2016.02); *Y02T 10/121* (2013.01); *Y02T 10/18* (2013.01)

(58) Field of Classification Search
    CPC .... F02D 13/0276; F02B 77/04; Y02T 10/121; Y02T 10/18
    USPC ........................................................ 60/605.1
    See application file for complete search history.

(56) References Cited

U.S. PATENT DOCUMENTS

| | | | | |
|---|---|---|---|---|
| 3,982,514 A * | 9/1976 | Turns | ............... | F02M 33/04 123/568.11 |
| 4,060,059 A | 11/1977 | Blaser | | |
| 4,191,150 A * | 3/1980 | Siewert | ............... | F02M 25/06 123/193.2 |
| 4,363,310 A | 12/1982 | Thurston | | |
| 4,592,318 A * | 6/1986 | Pouring | ............... | F02B 21/02 123/193.6 |
| 4,811,706 A * | 3/1989 | Leonard | ............... | F01M 1/08 123/193.6 |
| 4,829,958 A | 5/1989 | Duret | | |
| 5,357,919 A * | 10/1994 | Ma | ............... | F02B 17/00 123/193.2 |
| 6,119,647 A * | 9/2000 | Sytsma | ............... | F01M 13/00 123/193.6 |
| 6,378,482 B2 * | 4/2002 | Marcil | ............... | F16J 9/12 123/193.6 |
| 6,431,157 B1 * | 8/2002 | Marcil | ............... | F01M 13/00 123/568.11 |
| 6,935,220 B2 * | 8/2005 | Dunaevsky | ............... | F16J 9/206 92/159 |
| 7,428,889 B2 * | 9/2008 | Salzgeber | ............... | F02F 3/22 123/193.6 |
| 9,470,179 B2 * | 10/2016 | Donahue | ............... | F02F 3/24 |
| 2009/0126672 A1 | 5/2009 | Ostojic et al. | | |

FOREIGN PATENT DOCUMENTS

| | | |
|---|---|---|
| JP | 11-315722 A | 11/1999 |
| JP | 2005-105934 A | 4/2005 |
| WO | WO 97/042406 | 11/1997 |

OTHER PUBLICATIONS

International Search Report dated Feb. 27, 2014, in Patent Application No. PCT/EP2013/003928 by the European Patent Office (2 pages).

European Search Report dated Jun. 26, 2013, in EP Application 12 19 8856 (2 pages).

European Search Report dated May 28, 2013, in EP Application 12 19 8864 (2 pages).

U.S. Patent Application of Karl Stellwagen titled "Unburned Fuel Venting in Internal Combustion Engines" filed on Jun. 16, 2015.

* cited by examiner

UNBURNED FUEL VENTING IN INTERNAL COMBUSTION ENGINES

CLAIM FOR PRIORITY

This application is a U.S. National Phase entry under 35 U.S.C. § 371 from PCT International Application No. PCT/EP2013/003924, filed Dec. 20, 2013, which claims benefit of priority of European Patent Application No. 12198856.2, filed on Dec. 21, 2012, all of which are incorporated herein by reference.

TECHNICAL FIELD

The present disclosure generally relates to an internal combustion engine comprising at least one flow channel for venting unburned air/fuel-mixture out of a combustion chamber.

BACKGROUND

During operation of internal combustion engines, exhaust gases may include quench gases from the combustion chamber surfaces and crevice volumes in the spaces between the piston and cylinder wall where unburned fuel, especially unburned air/fuel-mixture, is present after the end of combustion in the engine cylinders. Therefore, it is desired to gain the amount of unburned air/fuel-mixture and to recycle the same during a subsequent combustion cycle.

For example, U.S. Pat. No. 4,191,150 A discloses an engine with selective venting of unburned mixture from the piston crevice volume. Particularly, venting means include one or more bypass channels in the cylinder wall which bypasses the piston rings and connects the crevice volume with the engine crankcase in the lower portions of the piston stroke. The mixture is removed during the latter portion of the power stroke.

U.S. Pat. No. 5,357,919 A discloses a hydrocarbon emission control for a four-stroke spark ignited internal combustion engine having a variable volume chamber and an auxiliary chamber with a fixed volume which is smaller than the maximum volume of the working chamber. The working chamber and the auxiliary chamber are connected to each other by a series of passages in the cylinder wall, wherein the passages in the cylinder wall are situated such that when the piston is near the top of its exhaust stroke, the end gases stored in the auxiliary chamber are discharged into the crankcase.

U.S. Pat. No. 6,431,157 B1 discloses an internal combustion engine comprising a cylinder block with at least one cylinder barrel, a cylinder head with at least one inlet channel and exhaust channel with related inlet and exhaust valves to a combustion chamber situated above a piston moveable in the cylinder barrel and a crankcase for lubricating oil situated below the piston. The piston includes at least two grooves situated at a distance from each other, each having a piston ring and a piston collection chamber contained between the rings.

The present disclosure is directed, at least in part, to improving or overcoming one or more aspects of prior systems.

SUMMARY OF THE DISCLOSURE

According to an aspect of the present disclosure, an internal combustion engine may comprise a cylinder defining a combustion chamber for combusting an air/fuel-mixture therein, a piston reciprocally movable within the cylinder between a top dead center and a bottom dead center and including a top end facing the combustion chamber and an uppermost piston ring configured to sealingly contact the cylinder, an annular crevice defined by the cylinder, the piston, the top end of the piston and the uppermost piston ring, and at least one flow channel fluidly connected to the combustion chamber and configured to direct unburned air/fuel-mixture out of the combustion chamber. The at least one flow channel may be configured and positioned to be directly fluidly connected to the annular crevice, when the piston has a position corresponding to a crank angle range of about 85° to 95° and about 265° to 275° after the top dead center.

According to another aspect of the present disclosure, a method for operating an internal combustion engine including a cylinder defining a combustion chamber within, a piston reciprocally movable within the cylinder between a top dead center and a bottom dead center, and an inlet channel configured to supply a predetermined amount of an air/fuel-mixture into the combustion chamber may comprise directing unburned air/fuel-mixture out of an annular crevice formed between the cylinder and the piston and being in fluid communication with the combustion chamber into the intake channel, only when the piston has a position corresponding to a crank angle range of about 85° to 95° after the top dead center during a power stroke of the internal combustion engine.

According to another aspect of the present disclosure, a cylinder liner configured to be inserted into a cylinder of an internal combustion engine may comprise a circumferential wall defining a combustion chamber for combusting an air/fuel-mixture therein. The circumferential wall may be configured to reciprocally guide a piston between a top dead center and a bottom dead center, wherein the piston may include a top end facing the combustion chamber and an uppermost piston ring configured to sealingly contact the circumferential wall, such that an annular crevice is defined by the circumferential wall, the piston, the top end of the piston and the uppermost piston ring. The cylinder liner may further comprise a plurality of venting holes extending through the circumferential wall. The plurality of venting holes may be configured and positioned to be directly fluidly connected to the annular crevice, when the piston has a position corresponding to a crank angle range of about 85° to 95° and about 265° to 275° after the top dead center.

In some embodiments, the internal combustion engine may further comprise a cylinder liner inserted into the cylinder, such that the piston is reciprocally disposed within the cylinder liner and the annular crevice is defined by the cylinder liner, the piston, the top end of the piston and the uppermost piston ring, wherein the cylinder liner may include a plurality of venting holes fluidly connected to the at least one flow channel.

In some embodiments, the internal combustion engine may further comprise an accumulating groove circumferentially disposed at the cylinder. The accumulating groove may be configured to be fluidly interconnected between the plurality of venting holes and the at least one flow channel.

In some embodiments, the internal combustion engine may further comprise a regulating valve fluidly connected to the at least one flow channel. The regulating valve may be configured to open, when the piston has a position corresponding to the crank angle range of about 85° to 95° after the top dead center during a power stroke of the internal combustion engine, and to close during an intake stroke, a compression stroke and an exhaust stroke of the internal combustion engine and when the piston has a position corresponding to a crank angle range of about 0° to 85° and 95° to 180° after the top dead center during the power stroke.

Other features and aspects of this disclosure will be apparent from the following description and the accompanying drawings.

DETAILED DESCRIPTION

Figure 1:
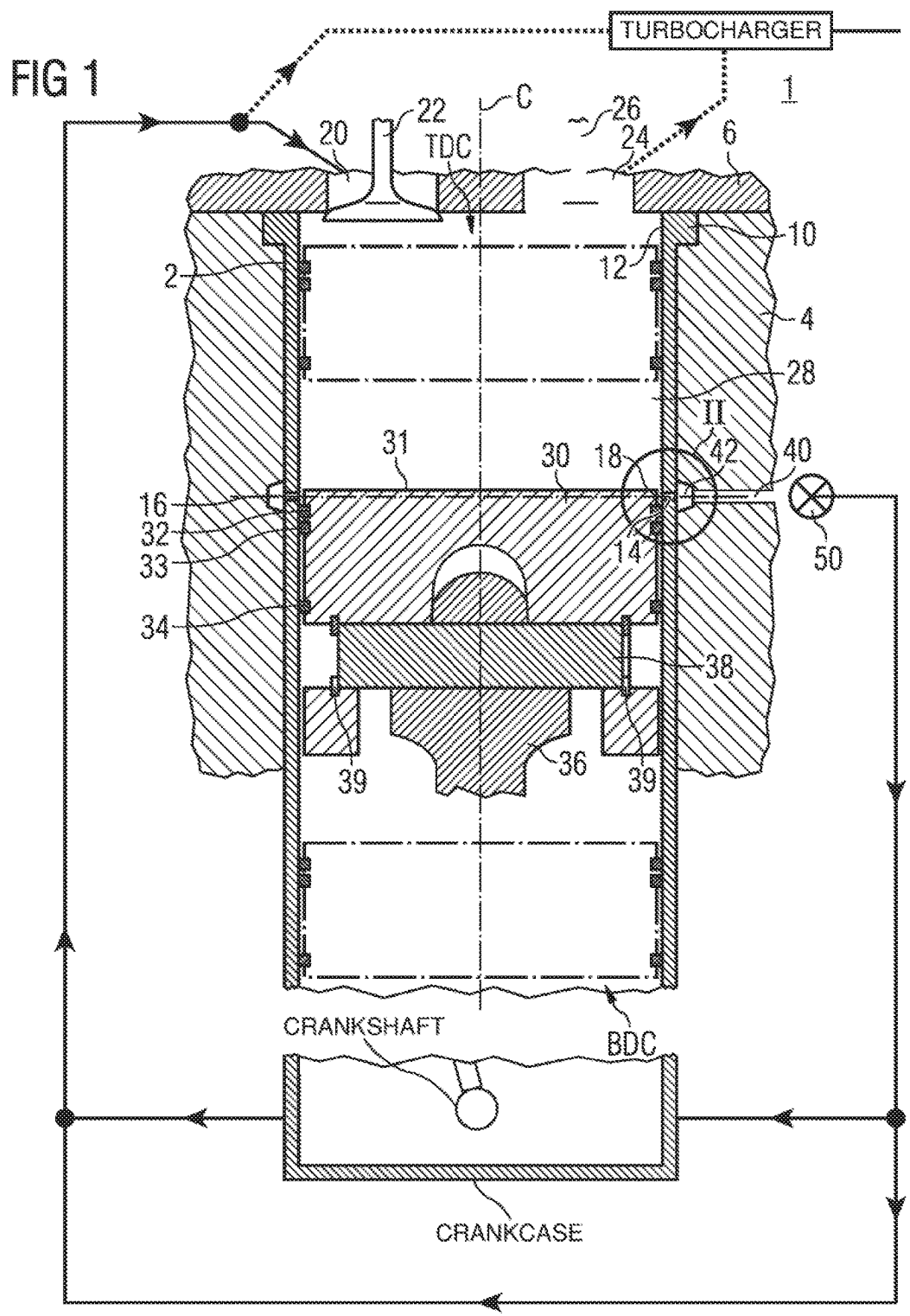
FIG. 1 shows a schematic view of an exemplary disclosed internal combustion engine.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that providing a cylinder of an internal combustion with at least one flow channel situated such that the at least one flow channel gets in direct fluid communication with an annular crevice trapping unburned air/fuel-mixture at a piston reciprocally disposed within the cylinder, when the piston has a position corresponding to a crank angle range of about 85° to 95° after the top dead center during the power stroke, may release unburned fuel from the annular crevice and, thus, may prevent exhausting the unburned air/fuel-mixture. Furthermore, this may increase the efficiency of the internal combustion engine.

The present disclosure may be further based in part on the realization that the internal combustion engine may also be provided with a cylinder liner being inserted into the cylinder. In such case, the cylinder liner includes a plurality of venting holes of which each is fluidly connected to the at least one flow channel. Also in such case, the unburned air/fuel-mixture trapped at the annular crevice formed by the cylinder liner and the piston reciprocally disposed within the cylinder liner may be released out of the combustion chamber and may be re-supplied for combusting in a subsequent combustion cycle.

According to the present disclosure, a direct fluid communication between the at least one flow channel and the annular crevice may be defined as a position of the piston in which the at least one flow channel faces the annular crevice. The same applies to an internal combustion engine having a cylinder liner including a plurality of venting holes. In such case, the plurality of venting holes faces the annular crevice for getting in direct fluid communication with the same.

Referring now to the drawings, a cylinder liner 10 inserted into a cylinder 2 of an engine block 4 of an internal combustion engine 1 is illustrated in FIG. 1. However, as already mentioned above, the present disclosure may be also applicable to internal combustion engines that may not comprise a cylinder liner.

The internal combustion engine 1 may include features not shown, such as fuel systems, air systems, cooling systems, peripheries, drive train components, etc. For the purposes of the present disclosure, the internal combustion engine 1 is considered as a four-stroke gaseous fuel internal combustion engine. One skilled in the art will recognize, however, that the internal combustion engine 1 may be any type of engine (gas, diesel, natural gas, propane, dual fuel, etc.) that would utilize ventilation of unburned air/fuel mixture out of the crevice volume from the combustion chamber. Furthermore, the gaseous fuel internal combustion engine 1 may be of any size, with any number of cylinders, and in any configuration ("V," in-line, radial, etc.).

The internal combustion engine 1 may be used to power any machine or other device, including locomotive applications, on-highway trucks or vehicles, off-highway trucks or machines, earth moving equipment, generators, aerospace applications, marine applications, pumps, stationary equipment, or other engine powered applications.

The cylinder liner 10 including a circumferential wall 12 defining a combustion chamber 28 therein is sealingly inserted into the cylinder 2. Particularly, sealing rings (not explicitly shown in the drawings) may be configured to seal between the cylinder liner 10 and the cylinder 2.

As shown in FIG. 1, a cylinder head 6 is configured to close an upper end of the cylinder 2 and the cylinder liner 10. The cylinder head 6 is provided with an inlet channel 20 and an outlet channel 24 being provided with an intake valve 22 and an exhaust valve 26, respectively. The inlet channel 20 may be connected to, for example, a gas mixer disposed upstream of the intake valve 22. The intake valve 22 is configured to open and close the inlet channel 20, thereby enabling or restricting air/fuel-mixture to enter the combustion chamber 28. The exhaust valve 26 is configured to open and close the outlet channel 24, thereby enabling or restricting exhaust gas to leave the combustion chamber 28. An engine control unit (not explicitly illustrated in the drawings) may be configured to control the intake valve 22 and the exhaust valve 26, respectively.

A piston 30 is reciprocally disposed within the cylinder liner 10 along an axis C and is movable between a top dead center (in the following referred to as TDC) and a bottom dead center (in the following referred to as BDC). Specifically, the piston 30 is configured to vary the volume of the combustion chamber 28 by reciprocally moving between the TDC and the BDC. The piston 30 is further indicated as being positioned in the TDC, which means near the intake valve 22 and the exhaust valve 26, and the BDC, which means the point farthest away from the intake valve 22 and exhaust valve 26. Both positions of the piston 30 the TDC and the BDC are indicated by dotted lines in FIG. 1.

The piston 30 includes a top end 31 facing the combustion chamber 28. The piston 30 is provided with an uppermost piston ring 32 and a lowermost piston ring 34 configured to seal the combustion chamber 28 against a portion below the piston 30, which means against the crankcase. The uppermost piston ring 32 and the lowermost piston ring 34 may be further considered as known scraper rings. As shown in FIG. 1, the piston 30 may be further provided with one intermediate piston ring 33. However, in some embodiments, the piston 30 may be provided with more than one intermediate piston ring configured to further seal the piston 30 against, for example, the crankcase.

The cylinder liner 10 includes a plurality of venting holes 14, 16 extending through the circumferential wall 12. Regarding FIG. 1, two venting holes 14 and 16 are shown. However, in some embodiments, the cylinder liner 10 may comprise less or more than two venting holes 14, 16. For example, the cylinder liner 10 may comprise six venting holes symmetrically disposed about the circumference of the cylinder liner 10. The plurality of venting holes 14, 16 is configured to release unburned air/fuel-mixture out of the combustion chamber 28.

Figure 2:
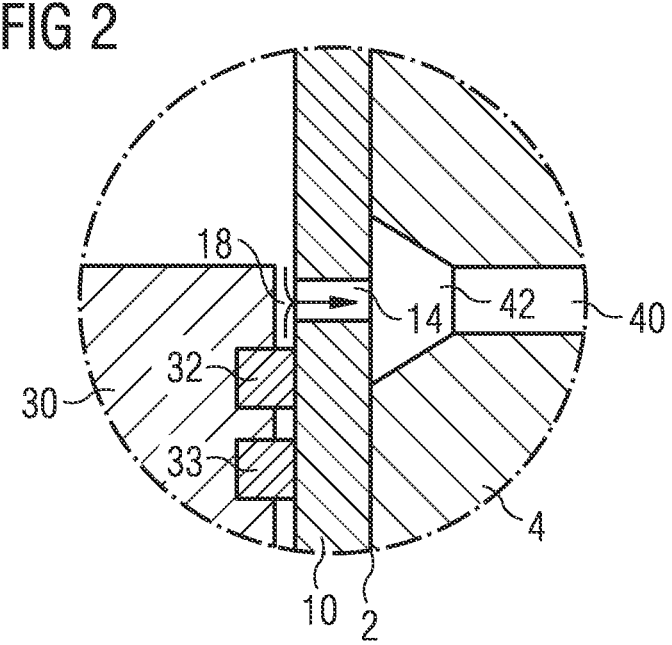
FIG. 2 shows a schematic view of an detail II-II of the internal combustion engine of FIG. 1.

Regarding FIG. 2, an enlarged view of the venting hole 14 is shown. As illustrated, an annular crevice 18 is formed at the piston 30. Particularly, the annular crevice 18 is defined by the cylinder liner 10, the circumference of the piston 30, the uppermost piston ring 32 and an imaginary elongation of the top end 31 of the piston 30. In some embodiments, which do not utilize a cylinder liner 10, the annular crevice 18 may be defined by an inner wall of the cylinder 2, the circumference of the piston 30, the uppermost piston ring 32 and an imaginary elongation of the top end 31 of the piston 30.

A piston rod 36 is connected to the piston 30 by a piston pin 38 being axially secured by two locking rings 39. The piston rod 36 is configured to be connected to a crankshaft (not shown in the drawings) disposed within a crankcase (not shown) of the engine block 4, such that rotation of the crankshaft results in a reciprocating motion of the piston 30 within the cylinder liner 10. The person skilled in the art will recognize that, at a crank angle of 0°, the piston 30 may be positioned at the TDC. Further, at a crank angle of 180°, the piston 30 may be positioned at the BDC.

The plurality of venting holes 14, 16 are positioned to be fluidly connected to the annular crevice 18, when the piston 30 is situated such that the crank angle is in a range from about 85° to 95° after the TDC, particularly during the power stroke of the internal combustion engine 1, which will be described in more detail below.

The engine block 4 includes at least one flow channel 40, one of which is shown in FIG. 1. The at least one flow channel 40 is provided in the engine block 4 at the cylinder 2 and is configured to be fluidly connected to the plurality of venting holes 14, 16. In the case that the internal combustion engine 1 may not utilize a cylinder liner 10, the at least one flow channel 40 may be fluidly connected to the combustion chamber 28.

An accumulating groove 42 is circumferentially provided at the cylinder 2 and is configured to be fluidly interconnected between the plurality of venting holes 14, 16 and the at least one flow channel 40. The accumulating groove 42 is configured to provide an accumulating space for the unburned air/fuel-mixture after being vented out of the combustion chamber 28 by the plurality of venting holes 14, 16, such that the unburned air/fuel-mixture may be directed out of the combustion chamber 28 via the at least one flow channel 40.

A regulating valve 50 may be provided in the at least one flow channel 40. The regulating valve 50 may be configured to open or close the at least one flow channel 40, thereby enabling or restricting gaseous fluid to pass therethrough. The regulating valve 50 may be controlled by an engine control unit (not shown in the drawings). In some embodiments, the regulating valve 50 may be a pressure regulating valve controlled by the pressure of the gas upstream and downstream of the pressure regulating valve.

The plurality of venting holes 14, 16, the accumulating groove 42, and the at least one flow channel 40 may define a leakage chamber. In the context of the present disclosure, the leakage chamber may be defined by the accumulating space extending from the combustion chamber 28 to the regulating valve 50 and may be configured to store an amount of vented unburned air/fuel-mixture and/or an amount of exhaust gas.

After venting the unburned air/fuel-mixture from the annular crevice 18 out of the combustion chamber 28 into the leakage chamber, the unburned air/fuel-mixture may be re-supplied to the inlet channel 20 and, thus, to the combustion chamber 28 during a subsequent combustion cycle. In some embodiments, the vented unburned air/fuel-mixture may be firstly directed into the crankcase, where the unburned air/fuel-mixture may be accumulated. Subsequently, the accumulated air/fuel-mixture within the crankcase may then be re-supplied to the combustion chamber 28 via the inlet channel 20.

It is noted that the internal combustion engine 1 may be provided without a cylinder liner 10. In such case, the at least one flow channel 40 is in direct fluid communication with the combustion chamber 28 and configured to release unburned air/fuel-mixture out of the combustion chamber 28, when the piston 30 is in the same position as mentioned above, namely when the crank angle is in a range from about 85° to 95°.

INDUSTRIAL APPLICABILITY

In the following, operation of the internal combustion engine 1 is described with reference to FIGS. 1 to 3.

Figure 3:
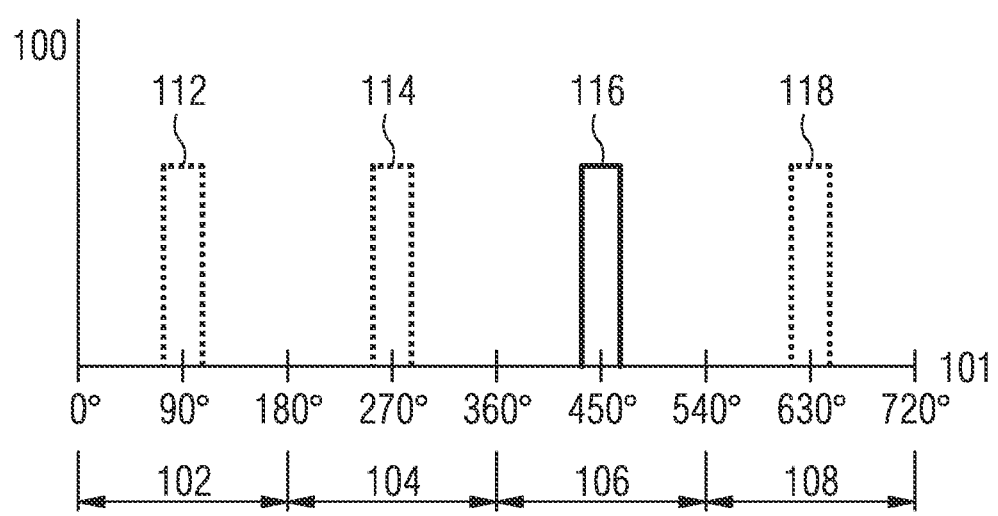
FIG. 3 is a graphical illustration associating the portions, where the annular crevice is in direct fluid communication with the at least one flow channel in dependency of the crank angle during a four-stroke cycle.

Referring to FIG. 3, a diagram is shown, wherein the ordinate 100 constitutes the portion in which the annular crevice 18 is in direct fluid communication with the plurality of venting holes 14, 16, and the abscissa 101 constitutes the crank angle over a complete four-stroke cycle including an intake stroke 102, a compression stroke 104, a power stroke 106, and an exhaust stroke 108, wherein a crank angle of 0° indicates the begin of the intake stroke and a crank angle of 720° indicates the end of the exhaust stroke and, thus, the end of the complete four-stroke cycle.

Specifically, during a crank angle range from 0° to 180°, the four-stroke cycle is in the intake stroke 102. During a crank angle range from 180° to 360°, the four-stroke cycle is in the compression stroke 104. During a crank angle range from 360° to 540°, the four-stroke cycle is in the power stroke 106. During a crank angle range from 540° to 720°, the four-stroke cycle is in the exhaust stroke 108.

Furthermore, at crank angles of 0°, 360° and 720°, the piston 30 is at the TDC, which means at the upper position indicated by the dotted lines in FIG. 1, whereas at crank angles of 180° and 540°, the piston 30 is at the BDC, which means at the lower position indicated by the dotted lines in FIG. 1.

As already mentioned above, at a crank angle of 0°, the four-stroke cycle starts with the intake stroke 102. At this time, the piston 30 is in the TDC and begins to move downwardly. Then, the intake valve 22 opens, such that, during the intake stroke 102, a predetermined amount of the air/fuel mixture is injected into the combustion chamber 28. The predetermined amount of the air/fuel-mixture may be provided under a predetermined intake pressure originating from, for example, a turbocharger unit of the internal combustion engine 1. At this time, the exhaust valve 26 and the regulating valve 50 are closed.

When the crank angle reaches about 85°, which means 85° after the TDC during the intake stroke 102, the annular crevice 18 gets in direct fluid communication with the plurality of venting holes 14, 16, such that a small amount of the air/fuel-mixture may penetrate into the leakage chamber. The leakage of air/fuel-mixture at this time is indicated by a first dotted line 112 in FIG. 3. However, as the regulating valve 50 is in the closed position, the amount of unburned air/fuel-mixture is restricted to pass through the regulating valve 50.

After passing the BDC at a crank angle of 180°, the piston 30 moves upwardly and the compression stroke 104 starts. Thus, at least at this time, the intake valve 22 closes such that the piston 30 compresses the air/fuel-mixture within the combustion chamber 28 while moving upwardly. During the compression stroke 104, the pressure of the air/fuel-mixture within the combustion chamber 28 and the leakage chamber may continuously increase, as the volume of the combustion chamber 28 continuously decreases during the upward movement of the piston 30.

During the crank angle range from about 85° to 275°, which means during the latter portion of the intake stroke 102 and the first portion of the compression stroke 104, the leakage chamber is continuously in fluid communication with the combustion chamber 28 and, thus, may be continuously filled with air/fuel-mixture having a pressure of, for example, about 2 bar The pressure within the combustion chamber 28 may depend on the engine load. Thus, it may be desired that the combustion chamber pressure corresponds to the actual charge pressure.

When reaching a crank angle of 265°, which means a crank angle of 85° after the BDC during the compression stroke 104, the annular crevice 18 gets again in direct fluid communication with the plurality of venting holes 14, 16. This is indicated by a second dotted line 114 in FIG. 3.

However, as the regulating valve 50 is still in the closed position the amount of air/fuel-mixture penetrated into the leakage chamber is still restricted from passing through the regulating valve 50.

When reaching a crank angle of about 275°, which means a crank angle of about 95° after the BDC during the compression stroke 104, the annular crevice 18 gets out of direct fluid communication with the plurality of venting holes 14, 16. Additionally, the plurality of venting holes 12, 14 gets completely out of fluid communication with the combustion chamber 28.

At this time, due to an increased pressure of the air/fuel-mixture within the leakage chamber caused by the compression of the air/fuel-mixture and/or due to the injected air/fuel-mixture being charged, the air/fuel-mixture trapped in the leakage chamber may flow out of the leakage chamber into the portion below the piston 30 and, subsequently, into the crankcase.

Particularly, when the piston 30 is provided with a lowermost piston ring 34, the air/fuel-mixture may first enter the section between the uppermost piston ring 32 and the lowermost piston ring 34. When the lowermost piston ring 34 passes the plurality of venting holes 14, 16 in an upward direction, the air/fuel-mixture is, then, allowed to flow out of the leakage chamber into the portion below the piston 30 and, subsequently, into the crankcase.

During the compression stroke 104, especially during a crank angle range of about 275° to 360°, which means a crank angle range of about 95° to 180° after the BDC during the compression stroke, at least some amount of the air/fuel-mixture may be urged into the annular crevice 18. As the uppermost piston ring 32 sealingly contacts the cylinder liner 10, the air/fuel-mixture trapped within the annular crevice 18 is restricted to flow further downwardly.

When reaching a crank angle of 360°, the piston 30 is in the TDC and the ignition may start. A spark plug (not shown) may provide a spark igniting the air/fuel-mixture within the combustion chamber 28. The burning mixture may expand and, thus, may urge the piston 30 downwardly, which means that the power stroke 106 starts.

However, as the burning fuel may be at least partially quenched when contacting the piston, the air/fuel-mixture trapped within the annular crevice 18 may not be ignited and, thus, may maintain unburned. Further, the expanding burning fuel may further urge the unburned air/fuel mixture into the annular crevice 18 and may further compress the same.

When reaching a crank angle of about 445°, which means a crank angle of about 85° after the TDC during the power stroke 106, the annular crevice 18 gets again in direct fluid communication with the plurality of venting holes 14, 16. This is indicated by the solid line 116 of FIG. 3. As the pressure of the unburned air/fuel mixture at this time may be, for example, about 20 bar, the unburned air/fuel-mixture trapped within the annular crevice 18 flows out of the combustion chamber 28 into the leakage chamber. At the same time, the regulating valve 50 opens, thereby enabling the vented amount of unburned air/fuel-mixture to pass through the regulating valve 50.

The regulating valve 50 maintains in the open state until a crank angle of about 455° is reached, which means a crank angle of 95° after the TDC during the power stroke 106. Then, the direct fluid communication between the annular crevice 18 and the plurality of venting holes 14, 16 is interrupted and the regulating valve 50 is closed.

Therefore, when the crank angle is in a range from about 445° to 455°, which means in a range from about 85° to 95° after the TDC during the power stroke 106, the annular crevice 18 is in direct fluid communication with the leakage chamber, and the regulating valve 50 is opened at that time.

Subsequently, during a crank angle range from about 455° to 625° which means during the latter portion of the power stroke 106 and the first portion of the subsequent exhaust stroke 108, at least some exhaust gas may flow into the leakage chamber. However, as the regulating valve 50 is closed during this portion of the power stroke 106, the exhaust gas is restricted from passing through the regulating valve 50.

When reaching a crank angle of 540°, which means that the piston 30 is in the BDC, the exhaust stroke 108 starts and the piston 30 begins to move upwardly again. At this time, the exhaust valve 26 opens and the piston 30 urges the exhaust gas out of the combustion chamber 28 through the outlet channel 24.

During a crank angle range from about 625° to 635°, which means a crank angle range from about 85° to 95° after the BDC during the exhaust stroke 108, the annular crevice 18 is again in direct fluid communication with the plurality of venting holes 14, 16, which is indicated by a third dotted line 118 in FIG. 3, but the regulating valve 50 is still closed, such that the exhaust gas is still restricted from leaving the leakage chamber through the regulating valve 50.

After passing a crank angle of about 635°, which means after passing a crank angle of about 95° after the BDC during the exhaust stroke 108, the annular crevice 18 is out of fluid communication with the leakage chamber.

During a crank angle range from about 635° to 720°, which means a crank angle range from about 95° to 180° after the BDC during the exhaust stroke 108, the exhaust gas trapped within the leakage chamber may flow into the portion below the piston 30 and, subsequently, into the crankcase (which was already described above in connection with the compression stroke 104).

At the end of the exhaust stroke 108, which also defines the end of the four-stroke cycle, the piston 30 is again in the TDC. Then, the above described four-stroke cycle may start again beginning with the intake stroke 102.

When unburned air/fuel-mixture and/or exhaust gas flows into the crankcase, a re-supplying connection (not shown) may be configured to fluidly connect the crankcase to the inlet channel 20, such that the unburned air/fuel-mixture may be re-supplied in a subsequent combustion cycle. In some embodiments, for example, in turbocharged engines, the unburned air/fuel-mixture may be re-supplied to an intake pipe upstream of a compressor of the turbocharger.

Furthermore, the amount of unburned air/fuel-mixture, which passed through the regulating valve 50 during the power stroke 106, may also be re-supplied to the inlet channel 20 for re-cycling this amount of unburned air/fuel mixture. In some embodiments, the amount of unburned air/fuel-mixture, which passed through the regulating valve 50 during the power stroke 106, may also be supplied to the crankcase and, then, into the inlet channel 20.

During the above-described four-stroke cycle, also some amount of exhaust gas may pass through the regulating valve 50. However, the some amount of exhaust gas may be much smaller than the amount of vented unburned air/fuel-mixture, such that this small amount of exhaust gas may be neglected.

Furthermore, during the compression stroke 104, some amount of the injected air/fuel-mixture may leak into the leakage chamber. Therefore, the amount of the air/fuel-mixture injected during the intake stroke 102 may be increase by the amount of the air/fuel-mixture leaking into the leakage chamber.

The plurality of venting holes 14, 16 may include a circular cross-section having a diameter in a range from, for example, about 0.5 mm to 2.0 mm. Thus, the accumulating groove 42 may comprise a trough-like cross-section being greater than the cross-section of a venting hole. The at least one flow channel 40 may include a circular cross-section having a diameter being in a range from, for example, about 5 mm to 20 mm.

As mentioned above, the engine control unit (not shown) may control opening and closing of the regulating valve 50. However, in some embodiments, the regulating valve 50 may be a pressure regulating valve which is controlled by the pressure upstream and downstream the pressure regulating valve. In such embodiments, the combustion chamber pressure may correspond to or be tightly greater than the charge pressure, such that a common pressure controller having a desired value tracking may be used.

Although the preferred embodiments of this invention have been described herein, improvements and modifications may be incorporated without departing from the scope of the following claims.

The invention claimed is:

1. An internal combustion engine comprising:
   a cylinder defining a combustion chamber for combusting an air/fuel-mixture therein;
   a piston reciprocally movable within the cylinder between a top dead center (TDC) and a bottom dead center (BDC), and including an uppermost piston ring configured to sealingly contact the cylinder;
   a cylinder liner inserted into the cylinder, such that the piston is reciprocally disposed within the cylinder liner;
   an annular crevice facing the combustion chamber and being defined by the cylinder liner, the piston, and the uppermost piston ring; and
   at least one flow channel fluidly connected to the combustion chamber and configured to direct unburned air/fuel-mixture out of the combustion chamber, the at least one flow channel being positioned to be fluidly connected to the annular crevice, when the piston has a position corresponding to a crank angle range of 85° to 95° after the top dead center (TDC) and 265° to 275° after the top dead center (TDC), wherein the cylinder liner includes a plurality of venting holes fluidly connected to the at least one flow channel.

2. The internal combustion engine of claim 1, wherein the venting holes have diameters in a range from 0.5 mm to 2.0 mm.

3. The internal combustion engine of claim 1, wherein the venting holes are symmetrically disposed about a circumference of the cylinder liner.

4. The internal combustion engine of claim 1, wherein the venting holes are radially disposed at the cylinder liner.

5. The internal combustion engine of claim 1, further comprising an accumulating groove circumferentially disposed at the cylinder, the accumulating groove being configured to be fluidly interconnected between the venting holes and the at least one flow channel.

6. The internal combustion engine of claim 1, further comprising a regulating valve fluidly connected to the at least one flow channel, the regulating valve being configured to open, when the piston has the position corresponding to the crank angle range of 85° to 95° after the top dead center (TDC) during a power stroke of the internal combustion engine, and close during an intake stroke, a compression stroke, and an exhaust stroke of the internal combustion engine, and when the piston has the position corresponding to the crank angle range of 0° to 85° and 95° to 180° after the top dead center (TDC) during the power stroke.

7. The internal combustion engine of claim 6, wherein the regulating valve is a pressure regulating valve.

8. The internal combustion engine of claim 1, wherein the at least one flow channel includes a diameter in a range from 5 mm to 20 mm.

9. An internal combustion engine comprising:
   a cylinder defining a combustion chamber for combusting an air/fuel-mixture therein;
   a piston reciprocally movable within the cylinder between a top dead center (TDC) and a bottom dead center (BDC), and including an uppermost piston ring configured to sealingly contact the cylinder;
   an annular crevice facing the combustion chamber and being defined by the cylinder liner, the piston, and the uppermost piston ring;
   at least one flow channel fluidly connected to the combustion chamber and configured to direct unburned air/fuel-mixture out of the combustion chamber, the at least one flow channel being positioned to be fluidly connected to the annular crevice, when the piston has a position corresponding to a crank angle range of 85° to 95° and 265° to 275° after the top dead center (TDC); and
   an inlet channel fluidly connected to the combustion chamber and configured to supply the air/fuel-mixture into the combustion chamber, wherein the at least one flow channel is configured to be fluidly connected to the inlet channel, such that the unburned air/fuel-mixture is re-supplied to the combustion chamber during a subsequent cycle.

10. The internal combustion engine of claim 9, further comprising a crankcase configured to include a crankshaft supporting the piston, wherein the crankcase is configured to be fluidly interconnected between the at least one flow channel and the inlet channel.

11. The internal combustion engine of claim 10, further comprising a re-supplying channel configured to be fluidly interconnected between the crankcase and the inlet channel.

12. The internal combustion engine of claim 10, further comprising a re-supplying channel configured to be fluidly interconnected between the crankcase and a compressor of a turbocharger.

13. A method for operating an internal combustion engine including a cylinder defining a combustion chamber within and a cylinder liner inserted into the cylinder, the method comprising:
   moving a piston reciprocally within the cylinder liner between a top dead center (TDC) and a bottom dead center (BDC);
   supplying a predetermined amount of an air/fuel-mixture into the combustion chamber; and
   directing unburned air/fuel-mixture out of an annular crevice formed between the cylinder liner, an uppermost piston ring and the piston and being in fluid communication with the combustion chamber into an intake channel via a plurality of venting holes formed in the cylinder liner, only when the piston has a position corresponding to a crank angle range of 85° to 95° after the top dead center (TDC) during a power stroke of the internal combustion engine.

14. The method of claim 13, wherein directing unburned air/fuel mixture out of the annular crevice further includes directing the unburned air/fuel-mixture into a crankcase configured to include a crankshaft supporting the piston and being disposed below the piston, before directing the unburned air/fuel-mixture into the intake channel.

15. The method of claim 13, further including directing the unburned air/fuel-mixture from the intake channel to the combustion chamber during a subsequent cycle.

16. A cylinder liner configured to be inserted into a cylinder of an internal combustion engine, the cylinder liner comprising:
   a circumferential wall defining a combustion chamber for combusting an air/fuel-mixture therein, the circumferential wall being configured to reciprocally guide a piston between a top dead center (TDC) and a bottom dead center (BDC), the piston including an uppermost piston ring configured to sealingly contact the circumferential wall, such that an annular crevice facing the combustion chamber is defined by the circumferential wall, the piston, and the uppermost piston ring; and
   a plurality of venting holes extending through the circumferential wall, the venting holes being configured and positioned to be fluidly connected to the annular crevice, when the piston has a position corresponding to a crank angle range of 85° to 95° after the top dead center (TDC) and 265° to 275° after the top dead center (TDC).

17. The cylinder liner of claim 16, wherein the plurality of venting holes have diameters in a range from 0.5 mm to 2.0 mm.

18. The cylinder liner of claim 16, wherein the venting holes are symmetrically disposed about a circumference of the cylinder liner.

19. The cylinder liner of claim 16, wherein a number of the venting holes is six.

* * * * *